United States Patent Office 3,211,773
Patented Oct. 12, 1965

---

3,211,773
CYCLOALKYL PERCARBONATE ESTERS
Michael Lederer, Frankfurt am Main, Germany, assignor to Farbwerke Hoechst Aktiengesellschaft vormals Meister Lucius & Bruning, Frankfurt am Main, Germany, a corporation of Germany
No Drawing. Filed Apr. 23, 1962, Ser. No. 189,295
Claims priority, application Germany, Apr. 26, 1961, F 33,756
2 Claims. (Cl. 260—463)

The present invention relates to peroxides and a process for preparing them.

It is known to convert peroxymonosulfuric acid into the benzoyl-peroxymonosulfuric acid salt of potassium by adding benzoyl chloride drop by drop, the reaction liquid being kept approximately neutral all the time by dropwise adding aqueous caustic potash solution. Instead of benzoyl chloride benzenesulfochloride may be used. In this case the potassium salt of the analogous benzenesulfonyl peroxymonosulfuric acid is obtained.

Now I have found that a new class of watersoluble peroxides can be obtained by reacting a bromoformate or, preferably, a chloroformate with an inorganic peracid or a salt thereof in the presence of a basic catalyst. The new peroxides have the formula $$RO-\underset{\underset{O}{\|}}{C}-O-O-Z$$

in which R represents a hydrocarbon radical which may have one or more inert substituents and Z stands for an oxygen-containing radical which is theoretically derived from a mineral acid containing hydroxyl groups or a salt of such an acid and in which radical the number of hydroxyl groups is fewer by one than that of the mineral acid or salt thereof from which the radical is derived.

In the above formula R consequently represents a straight-chain or branched, saturated or unsaturated alkyl radical, a cycloalkyl radical, an aralkyl radical, an aryl radical or a heterocyclic radical. In most cases these radicals contain 1 to 20 carbon atoms.

As suitable alkyl radicals having 1 to 20 carbon atoms there may be mentioned by way of example the methyl, ethyl, propyl, isopropyl, butyl, isobutyl, t-butyl, amyl, hexyl, dodecyl, cetyl and allyl groups. If alkyl groups having inert substituents are to be used there may be used, in particular, products obtained by the reaction of a hydroxy acid ester with phosgene. When, for example, hydroxy acetic acid ethyl ester is reacted with phosgene a chloroformate having a structure according to the formula $CH_3-CH_2-O-CO-CH_2-O-CO-Cl$ is obtained. In this formula, according to the above definition, R stands for $-CH_2-CO-O-CH_2-CH_3$. This means that R in cases in which it represents a substituted alkyl group is, in particular, an alkyl radical which is substituted by an esterified carboxyl group. The alcohol on which the esterified carboxyl group is based is in most cases an alkanol of low molecular weight which preferably contains 1 to 4 carbon atoms. As suitable cycloalkyl radicals represented by R there may be mentioned, in particular, those in which 5 or 6 carbon atoms are bound with one another to form a five- or six-membered ring, for example, the cyclopentyl radical, the cyclohexyl radical and the low alkyl homologs of these radicals, for example, the methyl- and ethylcyclopentyl radicals and the methyl- and ethylcyclohexyl radicals. As a suitable aralkyl radical the benzyl radical may be mentioned. Suitable aryl radicals are, in particular, mononuclear radicals, for example, the phenyl, tolyl, xylyl, t-butylphenyl and p-nitrophenyl radicals. Suitable heterocyclic radicals are, in particular, those of the furane or pyrane series, for example, the tetrahydrofuryl radical. R may also stand for an alkyl radical which is substituted by a furyl or a pyranyl radical, for example, the 2-furyl-methyl radical

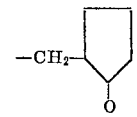

As chloro- or bromoformates of the formula $$RO-\underset{\underset{O}{\|}}{C}-X$$

all those are suitable for the reaction, in which R has the meaning given above and in which X stands for bromine or, preferably, chlorine.

As an inorganic peracid of the formula $$H-O-O-Z$$

there is in particular used peroxymonosulfuric acid. Other mineral peracids can, however, also be reacted within the scope of this invention, for example, peroxymonophosphoric acid and peroxycarbonic acid. In these cases the radical Z represents the sulfonic acid group $-SO_2OH$, the phosphonic acid group $-PO(OH)_2$ or the carboxylic group $-COOH$. These acids may also be used in the form of their alkali metal, ammonium or alkaline earth metal salts. Particularly preferred alkali salts are the potassium salts.

As basic catalysts are used, in particular, alkali or alkaline earth metal hydroxides or the corresponding carbonates or bicarbonates. As particularly suitable compounds of this kind may be mentioned sodium hydroxide, potassium hydroxide, ammonium hydroxide, lithium hydroxide, calcium hydroxide, sodium carbonate and sodium bicarbonate. As basic catalysts may also be used organic bases, in particular, tertiary bases containing up to 12 carbon atoms, for example, pyridine, quinoline, dimethyl aniline and other lower alkylated anilines and toluidines.

The reaction is in general carried out at a temperature within the range of $-30°$ to $+20°$ C., preferably of $-10°$ to $+10°$ C. The pH value of the reaction solution is advantageously within the range of 3 to 12. The pH values are preferably near the neutral point, that is to say within the range of 5 to 8. The chloro- or bromoformate, the inorganic peroxy compound and the mineral or organic bases are advantageously used in equimolar quantities. However, the reaction can also be carried out successfully when one or the other of the starting compounds is used in a quantity exceeding the calculated equimolar quantity.

The reaction of the chloro- or bromoformate with the mineral peracid or a salt thereof preferably takes place in an aqueous medium. It is particularly suitable first to place the mixture of the two starting components into the reaction vessel, then to adjust the desired pH value by means of a buffer substance and to introduce the basic catalyst drop by drop into the aforesaid solution. If peroxymonosulfuric acid or a potassium salt thereof is used an aqueous solution of such a peroxy compound is prepared at a temperature below 15° C. in the presence of potassium bicarbonate or secondary sodium phosphate, the desired reaction temperature is adjusted and the total quantity of the chloroformic acid ester is added. Then the basic catalyst is slowly added drop by drop while the reactants are vigorously mixed, for example, by stirring or by means of a vibration mixer. The chloro- or bromoformate may also be added by and by to the aqueous solution of the peroxy compound simultaneously with the basic catalyst, but this measure does not offer any particular advantage.

In some cases it may be advantageous to add an inert organic solvent, for example, tetrahydrofurane, dioxane, ligroin or benzene, to the reaction mixture.

The peroxides according to the invention are in general well soluble in water at medium temperatures. At temperatures of about 0° C. the potassium salts of some peroxides are sparingly soluble in water and separate out in the form of crystals. From this fact results a possibility of isolating the reaction products. The compounds that are sparingly soluble at 0° C. are separated by filtration. Other peroxides prepared according to the invention which are readily soluble in water even at low temperatures can be isolated by evaporating the water under mild conditions, for example, under reduced pressure.

The peroxides according to the invention can be used as oxidizing agents, bleaching agents, hardening agents, chlorination catalysts or very active polymerization catalysts, for example, for the polymerization of mono- and polyolefins, halogenated olefins, vinyl compounds, acrylic acid and the derivatives thereof.

The following example serves to illustrate the invention but it is not intended to limit it thereto.

*Example*

In a glass apparatus provided with stirring means, thermometer and dropping funnel a solution of 25 grams of potassium peroxymonosulfate of 40% strength in 150 grams of water was rendered neutral at 5° C. by the addition of sodium bicarbonate. 10 grams of cyclohexyl chloroformate were added. Then 19 grams of a 20% aqueous potassium hydroxide solution were dropped in while stirring at a temperature within the range of 0° to 5° C. After a short time the reaction product separated out in the form of crystals. It was separated from the aqueous phase, washed with ice water and then with diethyl ether. The peroxide had the following formula

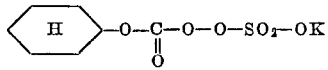

Analysis: $C_7H_{11}O_7SK$ (27.25)—

|  | C | H | S | K | O-active |
|---|---|---|---|---|---|
| Calculated_____percent__ | 30.15 | 3.95 | 11.5 | 14.05 | 5.78 |
| Found_____do____ | 29.8 | 4.3 | 11.6 | 14.7 | 5.7 |

I claim:
1. A water-soluble peroxide of the formula

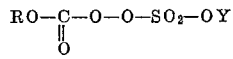

in which R stands for a member selected from the group consisting of cyclopentyl and cyclohexyl groups and Y represents a member selected from the group consisting of alkali metal, alkaline earth metal and ammonium.

2. The product having the formula

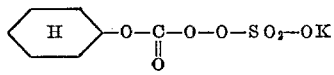

References Cited by the Examiner
UNITED STATES PATENTS

| 2,370,588 | 2/45 | Strain | 260—463 |
| 2,464,056 | 3/49 | Pechukas | 260—463 |

FOREIGN PATENTS

| 1,011,623 | 7/57 | Germany. |

OTHER REFERENCES

Willstatter et al., Ber Deut. Chemie, vol. 42, 1909, pp. 1839–1850.

CHARLES B. PARKER, *Primary Examiner.*

LEON ZITVER, *Examiner.*